(12) United States Patent
Yao et al.

(10) Patent No.: US 11,867,616 B2
(45) Date of Patent: Jan. 9, 2024

(54) OPTICAL DETECTION SYSTEM

(71) Applicants: State Grid Chongqing Electric Power Co. Electric Power Research Institute, Chongqing (CN); State Grid Corporation of China, Beijing (CN)

(72) Inventors: Qiang Yao, Chongqing (CN); Shiling Zhang, Chongqing (CN); Yulong Miao, Chongqing (CN); Yongtao Chen, Chongqing (CN); Xintian Li, Chongqing (CN)

(73) Assignees: State Grid Chongqing Electric Power Co. Electric Power Research Institute, Chongqing (CN); State Grid Corporation of China, Beijing (CN)

( * ) Notice: Subject to any disclaimer, the term of this patent is extended or adjusted under 35 U.S.C. 154(b) by 560 days.

(21) Appl. No.: 17/251,810

(22) PCT Filed: Oct. 29, 2020

(86) PCT No.: PCT/CN2020/124769
§ 371 (c)(1),
(2) Date: Dec. 13, 2020

(87) PCT Pub. No.: WO2022/082838
PCT Pub. Date: Apr. 28, 2022

(65) Prior Publication Data
US 2022/0317032 A1    Oct. 6, 2022

(30) Foreign Application Priority Data

Oct. 20, 2020 (CN) .......................... 202011126141.X

(51) Int. Cl.
*G01N 21/3504* (2014.01)
*G01J 3/42* (2006.01)
*G01N 21/39* (2006.01)

(52) U.S. Cl.
CPC ............ *G01N 21/3504* (2013.01); *G01J 3/42* (2013.01); *G01N 21/39* (2013.01); *G01J 2003/423* (2013.01)

(58) Field of Classification Search
None
See application file for complete search history.

(56) References Cited

U.S. PATENT DOCUMENTS 6,067,840 A * 5/2000 Chelvayohan ..... G01N 21/3504
250/343

FOREIGN PATENT DOCUMENTS

CN    103207162 A    7/2013
CN    104535529 A    4/2015
(Continued)

*Primary Examiner* — Hoon K Song

(57) ABSTRACT

Disclosed is an optical detection system for detecting a decomposition product of a high-voltage device, including: a measurement gas chamber and a measurement host. The measurement gas chamber is disposed on the high-voltage device and is in communication with a gas chamber of the high-voltage device, a collimator and a reflector are disposed on two sides of the measurement gas chamber respectively, and the measurement host is connected to the collimator. The collimator is used for emitting measurement laser to the measurement gas chamber according to a laser signal sent by the measurement host, and receiving reflected laser from the reflector and transmitting the reflected laser to the measurement host. In the present invention, data collection and backhaul between a measurement host and a measurement gas chamber are implemented through a laser signal, thus avoiding electromagnetic interference and improving the safety of measurement for a high-voltage device.

17 Claims, 2 Drawing Sheets

(56) References Cited

FOREIGN PATENT DOCUMENTS

| | | | |
|---|---|---|---|
| CN | 107389603 | A | 11/2017 |
| CN | 107449755 | A | 12/2017 |
| CN | 109991188 | A | 7/2019 |

\* cited by examiner

OPTICAL DETECTION SYSTEM

TECHNICAL FIELD

The present invention relates to the technical field of analysis of decomposition products of components on a high-voltage device, and in particular, to an optical detection system.

BACKGROUND

As the tunable diode laser absorption spectroscopy matures gradually, it gradually becomes the mainstream detection technology in replacement of conventional measurement methods such as electrochemical measurement and non-dispersive infrared measurement. In current optical measurement methods based on the tunable diode laser absorption spectroscopy, the absorption principle is based on the Beer-Lambert law, where the detection precision is directly proportional to the optical path length, and a longer optical path indicates higher detection precision.

When the system does not require a high detection capability or a detected gas has high absorptivity, the optical path length does not need to be increased. Laser can be directly focused within a core diameter of an optical fiber after absorption by the gas. After transmission over the optical fiber, an optical signal is converted into an electrical signal by using an optical-to-electrical converter in a device host. When the system requires a high detection capability or a detected gas has weak absorptivity, the optical path length needs to be increased. After the laser is transmitted over a long distance, a relatively large spot is generated due to divergence, and it is difficult to focus the laser within the core diameter of the optical fiber. The optical signal needs to be directly converted into an electrical signal by using an optical-to-electrical converter. The problem of the existing solution lies in that, in the case of a long optical path, a collimated light beam diverges gradually during propagation, and a detector needs to be disposed in a gas chamber to convert an optical signal into an electrical signal. The electrical signal is vulnerable to electromagnetic interference, and the high-voltage device has a high voltage therein, which causes inconvenience in use and is unsafe.

SUMMARY

To solve the foregoing defects in the prior art, an objective of the present invention is to provide an optical detection system, to avoid electrical signal transmission and improve the safety of measurement for a high-voltage device.

To achieve the above purpose, the present invention provides the following technical solution: An optical detection system, for detecting a decomposition product of a high-voltage device, comprising: a measurement gas chamber and a measurement host;
  where the measurement gas chamber is disposed on the high-voltage device and is in communication with a gas chamber of the high-voltage device, a collimator and a reflector are disposed on two sides of the measurement gas chamber respectively, and the measurement host is connected to the collimator; and
  the collimator is used for emitting measurement laser to the measurement gas chamber according to a laser signal sent by the measurement host, and receiving reflected laser from the reflector and transmitting the reflected laser to the measurement host.

Optionally, the measurement host includes a laser device, a switching module, and an infrared detector;
  the switching module is connected to the laser device and the infrared detector;
  the switching module is used for transmitting a laser signal from the laser device to the collimator, and transmitting the reflected laser from the collimator to the infrared detector.

Optionally, the switching module is a circulator or a beam splitter.

Optionally, the measurement host further includes a beam combining unit, and the laser device comprises at least a first laser device and a second laser device;
  the first laser device and the second laser device are both connected to the beam combining unit, and the beam combining unit is connected to the switching module; and
  the first laser device and the second laser device are used for measuring decomposition products of different components respectively.

Optionally, the first laser device and the second laser device are used at different moments, to measure decomposition products of different components.

Optionally, the switching module includes at least a first switching module and a second switching module, the infrared detector includes at least a first infrared detector and a second infrared detector, and the measurement gas chamber includes at least a first measurement gas chamber and a second measurement gas chamber; and
  the measurement host further includes a beam splitting unit, the beam splitting unit is connected to the beam combining unit, the first switching module and the second switching module are connected to the beam splitting unit, the first switching module is further connected to the first measurement gas chamber and the first infrared detector, and the second switching module is further connected to the second measurement gas chamber and the second infrared detector.

Optionally, the beam combining unit is a beam combiner or an optical multiplexer.

Optionally, the measurement gas chamber is disposed on the high-voltage device through a mounting flange.

Optionally, the mounting flange has a shape the same as that of an overhaul flange of the high-voltage device.

Optionally, the reflector is a concave reflector.

The present invention utilizes the above technical solution and thus has beneficial effects as follows: Data collection and backhaul between a measurement host and a measurement gas chamber are implemented through a laser signal, so that no electrical signal is transmitted, thus avoiding electromagnetic interference and improving the safety of measurement for a high-voltage device.

Other advantages, objectives and features of the present invention will be illustrated in the subsequent description in some degree, and will be apparent to those skilled in the art in some degree based on study on the following description, or those skilled in the art may obtain teachings by practicing the present invention.

BRIEF DESCRIPTION OF THE DRAWINGS

The accompanying drawings of the present invention are described as follows.

DETAILED DESCRIPTION

The present invention is described in further detail below with reference to the accompanying drawings and embodiments.

Embodiment 1

Figure 1:
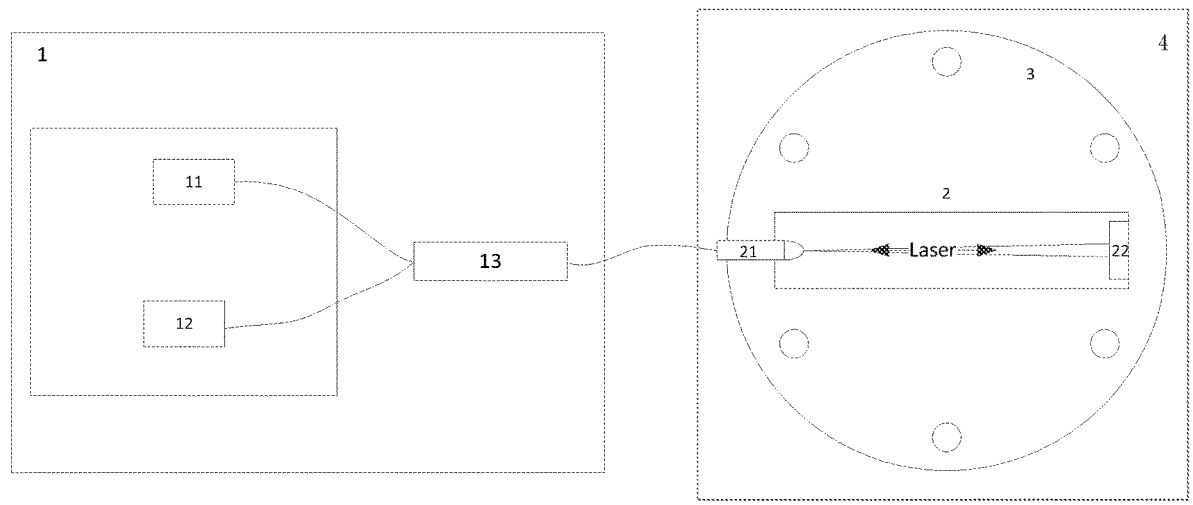
FIG. 1 is a schematic structural diagram of Embodiment 1 of the present invention

Embodiment 1 of the present invention provides an optical detection system, for detecting a decomposition product of a high-voltage device. As shown in FIG. 1, the optical detection system includes: a measurement gas chamber 2 and a measurement host 1.

The measurement gas chamber 2 is disposed on the high-voltage device 4 and is in communication with a gas chamber of the high-voltage device 4. A collimator 21 and a reflector 22 are disposed on two sides of the measurement gas chamber respectively, and the measurement host is connected to the collimator 21.

The collimator 21 is used for emitting measurement laser to the measurement gas chamber according to a laser signal sent by the measurement host 1; and receiving reflected laser from the reflector 22, and transmitting the reflected laser to the measurement host 1.

Specifically, in this embodiment, the collimator 21 and the reflector 22 are disposed on two sides of the measurement gas chamber 2 respectively. For example, in FIG. 1, the measurement gas chamber 2 is cuboid-shaped, the collimator 21 is disposed on one end surface of the measurement gas chamber, and the reflector 22 is disposed on another end surface of the measurement gas chamber. During decomposition product detection, laser is transmitted to the reflector 22 through the collimator 21, and then returns to the collimator 21 through the reflector 22. In the two identical optical paths, gas is filled by using the high-voltage device, to generate absorption. By collection of light intensity data after absorption, the concentration of the detected gas can be calculated. That is, the concentration of the detected gas can be calculated by collecting the reflected laser.

The present invention has a simple structure. Moreover, data collection and backhaul between the measurement host and the measurement gas chamber are implemented through a laser signal. Based on this, the concentration of the detected gas can be calculated, so that no electrical signal is transmitted, thus avoiding electromagnetic interference and improving the safety of the high-voltage device.

Optionally, the measurement host 1 includes a laser device 11, a switching module and an infrared detector 12, and the switching module is a circulator 13.

The circulator 13 is connected to the laser device 11 and the infrared detector 12.

The circulator 13 is used for transmitting a laser signal from the laser device 11 to the collimator 21, and transmitting the reflected laser from the collimator 21 to the infrared detector 12.

Optionally, the switching module is a circulator or a beam splitter.

Specifically, as shown in FIG. 1, the measurement host in this embodiment includes two parts; both the laser device 11 and the infrared detector 12 may be disposed on a laser drive and signal processing circuit board, and may be controlled through a specific circuit and accessories. The switching module is disposed inside the measurement host. The switching module is a circulator or a beam splitter. In this embodiment, the switching module being a circulator is taken as an example for description. The circulator 13 is connected to the laser device 11 and the infrared detector 12 through optical fibers. The circulator 13 is further connected to the collimator 21 through an optical fiber, to implement the collection and backhaul functions of the system.

Herein, the circulator 13 is used for transmitting the laser signal from the laser device 1 to the collimator 21, and transmitting, to the infrared detector 12, the reflected laser returned by the reflector 22 to the collimator 21. The infrared detector 12 collects, according to the reflected laser, light intensity data after absorption.

Optionally, the reflector is a concave reflector.

Specifically, by using the concave reflector, the measurement laser emitted by the collimator can be converged and then reflected back to the collimator 21.

Optionally, the measurement gas chamber 2 is disposed on the high-voltage device through a mounting flange 3.

Optionally, the mounting flange 3 has a shape the same as that of an overhaul flange of the high-voltage device.

Specifically, as shown in FIG. 1, the measurement gas chamber 2 is disposed on the high-voltage device through the mounting flange 3. In a specific implementation process, the shape of the mounting flange 3 is the same as that of the overhaul flange of the high-voltage device, so that the mounting flange 3 can be directly used as a substitute of the overhaul flange, thereby improving detection efficiency.

In conclusion, the measurement gas chamber 2 is disposed on the high-voltage device through the mounting flange 3. The measurement host 1 is connected to the measurement gas chamber 2 through an optical fiber. The measurement process does not affect the insulation property of the high-voltage device, thereby avoiding the safety hazard caused by a wire connection between the high-voltage device and the host. The detection system in the present invention can simplify a field measurement structure, and the measurement on the high-voltage device can be completed by using a single optical fiber. No electrical signal is transmitted, so that the measurement on the high-voltage device is safer.

Embodiment 2

Figure 2:
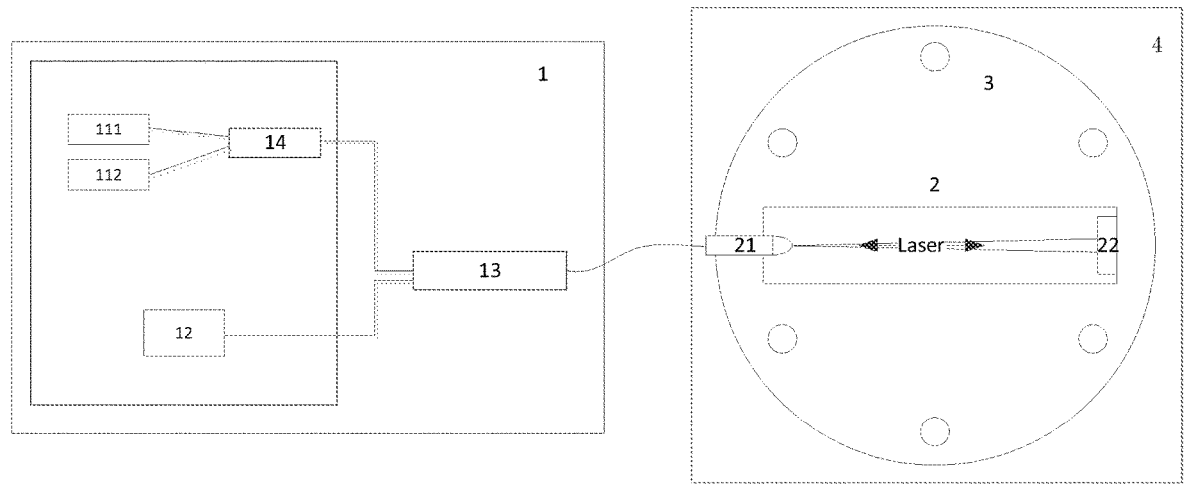
FIG. 2 is a schematic structural diagram of Embodiment 2 of the present invention.

Embodiment 2 of the present invention provides an optical detection system, for detecting a decomposition product of a high-voltage device. As shown in FIG. 2, the optical detection system includes: a measurement gas chamber 2 and a measurement host 1.

The measurement gas chamber 2 is disposed on the high-voltage device and is in communication with a gas chamber of the high-voltage device. A collimator 21 and a reflector 22 are disposed on two sides of the measurement gas chamber respectively, and the measurement host is connected to the collimator 21.

The collimator 21 is used for emitting measurement laser to the measurement gas chamber according to a laser signal sent by the measurement host 1; and receiving reflected laser from the reflector 22, and transmitting the reflected laser to the measurement host 1.

Specifically, in this embodiment, the collimator 21 and the reflector 22 are disposed on two sides of the measurement gas chamber 2 respectively. For example, in FIG. 1, the measurement gas chamber 2 is cuboid-shaped, the collimator 21 is disposed on one end surface of the measurement gas chamber, and the reflector 22 is disposed on another end surface of the measurement gas chamber. During decomposition product detection, laser is transmitted to the reflector 22 through the collimator 21, and then returns to the collimator 21 through the reflector 22. In the two identical optical paths, gas is filled by using the high-voltage device, to generate absorption. By collection of light intensity data after absorption, the concentration of the detected gas can be calculated. That is, the concentration of the detected gas can be calculated by collecting the reflected laser.

Optionally, the measurement host further includes a beam combining unit, and the laser device includes at least a first laser device and a second laser device.

The first laser device and the second laser device are both connected to the beam combining unit 14, and the beam combining unit 14 is connected to the circulator 13.

The first laser device and the second laser device are used for measuring decomposition products of different components respectively.

Optionally, the beam combining unit is a beam combiner or an optical multiplexer.

Specifically, different from Embodiment 1, this embodiment includes a plurality of laser devices. The specific number of laser devices is not limited herein. In this embodiment, the structure in FIG. 2 is taken as an example for description. As shown in FIG. 2, the structure includes a first laser device 111 and a second laser device 112. The first laser device 111 and the second laser device 112 are connected to the beam combining unit 14 through optical fibers, where the beam combining unit 14 may be a beam combiner or an optical multiplexer.

The first laser device 111 and the second laser device 112 may be used for measuring different gases respectively, and are disposed on the same circuit board, where the circuit board is controlled through software.

Similar to Embodiment 1, the switching module is disposed inside the measurement host. The switching module is a circulator or a beam splitter. In this embodiment, the switching module being a circulator is taken as an example for description. The circulator 13 is connected to the beam combining unit 14 and the infrared detector 12 through optical fibers. The circulator 13 is further connected to the collimator 21 through an optical fiber, to implement the collection and backhaul functions of the system.

The circulator 13 is used for transmitting the laser signal from the beam combining unit 14 to the collimator 21, and transmitting, to the infrared detector 12, the reflected laser returned by the reflector 22 to the collimator 21. The infrared detector 12 collects, according to the reflected laser, light intensity data after absorption.

Optionally, the first laser device and the second laser device are used at different moments, to measure decomposition products of different components.

Specifically, the first laser device 111 and the second laser device 112 are used at different moments, so that two or more types of gases can be measured by using the gas chamber of the same measurement flange. In this embodiment, the beam combiner converges laser emitted by a plurality of laser devices into one optical fiber, to develop a measurement system capable of measuring different components through time division multiplexing.

Optionally, the reflector is a concave reflector.

Specifically, by using the concave reflector, the measurement laser emitted by the collimator can be converged and then reflected back to the collimator 21.

Optionally, the measurement gas chamber is disposed on the high-voltage device through a mounting flange.

Optionally, the mounting flange has a shape the same as that of an overhaul flange of the high-voltage device.

Specifically, as shown in FIG. 2, the measurement gas chamber 2 is disposed on the high-voltage device through the mounting flange 3. In a specific implementation process, the shape of the mounting flange 3 is the same as that of the overhaul flange of the high-voltage device, so that the mounting flange 3 can be directly used as a substitute of the overhaul flange, thereby improving detection efficiency.

In conclusion, the measurement gas chamber 2 is disposed on the high-voltage device through the mounting flange 3. The measurement host 1 is connected to the measurement gas chamber 2 through an optical fiber. The measurement process does not affect the insulation property of the high-voltage device, thereby avoiding the safety hazard caused by a wire connection between the high-voltage device and the host. The detection system in the present invention can simplify a field measurement structure, and the measurement on the high-voltage device can be completed by using a single optical fiber. No electrical signal is transmitted, so that the measurement on the high-voltage device is safer, and multiple types of gases can be measured at the same time.

Embodiment 3

Figure 3:
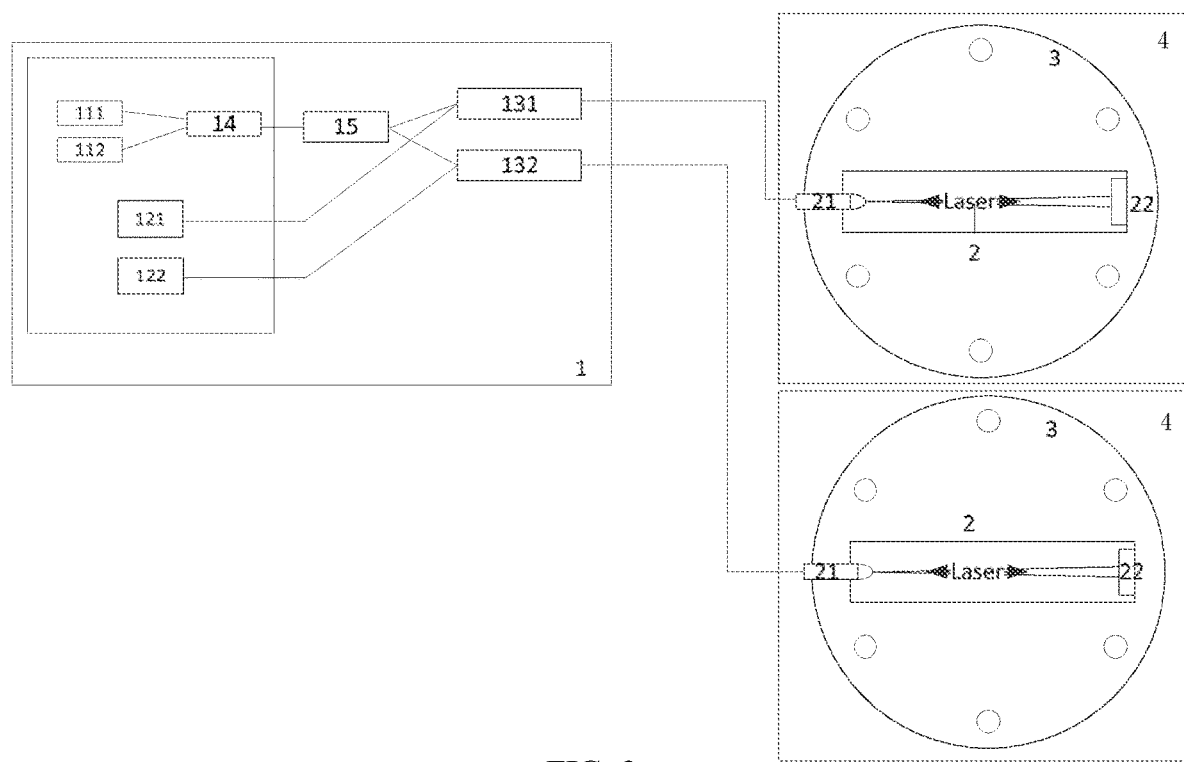
FIG. 3 is a schematic structural diagram of Embodiment 3 of the present invention.

Embodiment 3 of the present invention provides an optical detection system, for detecting a decomposition product of a high-voltage device. As shown in FIG. 3, the optical detection system includes: a measurement gas chamber 2 and a measurement host 1.

The measurement gas chamber 2 is disposed on the high-voltage device and is in communication with a gas chamber of the high-voltage device. A collimator 21 and a reflector 22 are disposed on two sides of the measurement gas chamber respectively, and the measurement host is connected to the collimator 21.

The collimator 21 is used for emitting measurement laser to the measurement gas chamber according to a laser signal sent by the measurement host 1; and receiving reflected laser from the reflector 22, and transmitting the reflected laser to the measurement host 1.

Specifically, in this embodiment, the collimator 21 and the reflector 22 are disposed on two sides of the measurement gas chamber 2 respectively. For example, in FIG. 1, the measurement gas chamber 2 is cuboid-shaped, the collimator 21 is disposed on one end surface of the measurement gas chamber, and the reflector 22 is disposed on another end surface of the measurement gas chamber. During decomposition product detection, laser is transmitted to the reflector 22 through the collimator 21, and then returns to the collimator 21 through the reflector 22. In the two identical optical paths, gas is filled by using the high-voltage device, to generate absorption. By collection of light intensity data after absorption, the concentration of the detected gas can be calculated. That is, the concentration of the detected gas can be calculated by collecting the reflected laser.

Optionally, the measurement host further includes a beam combining unit, and the laser device includes at least a first laser device and a second laser device.

The first laser device and the second laser device are both connected to the beam combining unit 14, and the beam combining unit 14 is connected to the circulator 13.

The first laser device and the second laser device are used for measuring decomposition products of different components respectively.

Optionally, the beam combining unit is a beam combiner or an optical multiplexer.

Specifically, this embodiment includes a plurality of laser devices. The specific number of laser devices is not limited herein. In this embodiment, the structure in FIG. 3 is taken as an example for description. As shown in FIG. 3, the structure includes a first laser device 111 and a second laser device 112. The first laser device 111 and the second laser device 112 are connected to the beam combining unit 14 through optical fibers, where the beam combining unit 14 may be a beam combiner or an optical multiplexer.

The first laser device 111 and the second laser device 112 may be used for measuring different gases respectively, and are disposed on the same circuit board, where the circuit board is controlled through software.

Optionally, the switching module includes at least a first switching module and a second switching module. The infrared detector includes at least a first infrared detector and a second infrared detector. The measurement gas chamber includes at least a first measurement gas chamber and a second measurement gas chamber.

The measurement host further includes a beam splitting unit. The beam splitting unit is connected to the beam combining unit. The first switching module and the second switching module are connected to the beam splitting unit. The first switching module is further connected to the first measurement gas chamber and the first infrared detector. The second switching module is further connected to the second measurement gas chamber and the second infrared detector.

Different from Embodiment 2, in this embodiment, the measurement host 1 is connected to a plurality of measurement gas chambers at the same time. The specific number of connected measurement gas chambers is not limited herein. In this embodiment, the system structure shown in FIG. 3 is taken as an example for description, where two measurement gas chambers are provided. The switching module is disposed inside the measurement host. The switching module is a circulator or a beam splitter. In this embodiment, the switching module being a circulator is taken as an example for description. As shown in FIG. 3, the measurement host further includes a beam splitting unit 15, a first circulator 131, a second circulator 132, a first infrared detector 121 and a second infrared detector 122, where the first circulator 131 and the second circulator 132 are respectively connected to the collimators 21 of the two measurement gas chambers through optical fibers.

Based on the beam combining unit 14 in Embodiment 2, in this embodiment, the measurement host further includes a beam splitting unit 15, where the beam splitting unit 15 is connected to the beam combining unit 14 through an optical fiber. The first circulator 131 is connected to the beam splitting unit 15 and the first infrared detector 121, and the second circulator 132 is connected to the beam splitting unit 15 and the second infrared detector 122, to form two measurement loops. The first circulator 131 is connected to the beam splitting unit 15 and the infrared detector 121 through optical fibers, and is further connected to the collimator 21 of the first measurement gas chamber through an optical fiber, thereby achieving the collection and backhaul functions of the system for the first measurement gas chamber. The second circulator 132 is connected to the beam splitting unit 15 and the infrared detector 122 through optical fibers, and is further connected to the collimator 21 of the second measurement gas chamber through an optical fiber, thereby achieving the collection and backhaul functions of the system for the second measurement gas chamber. Therefore, in this embodiment, laser emitted by the laser device is uniformly distributed to a plurality of optical fibers through the beam combiner or the optical multiplexer, and each optical fiber is connected to one measurement gas chamber, to develop a measurement system capable of measuring a plurality of measurement points simultaneously.

Optionally, the reflector is a concave reflector.

Specifically, by using the concave reflector, the measurement laser emitted by the collimator can be converged and then reflected back to the collimator 21.

Optionally, the measurement gas chamber is disposed on the high-voltage device through a mounting flange.

Optionally, the mounting flange has a shape the same as that of an overhaul flange of the high-voltage device.

Specifically, as shown in FIG. 3, the measurement gas chamber 2 is disposed on the high-voltage device through the mounting flange 3. In a specific implementation process, the shape of the mounting flange 3 is the same as that of the overhaul flange of the high-voltage device, so that the mounting flange 3 can be directly used as a substitute of the overhaul flange, thereby improving detection efficiency.

In conclusion, multiple measurement gas chambers 2 are disposed on the high-voltage device through the mounting flange 3. The measurement host 1 is connected to the measurement gas chambers 2 through optical fibers. The measurement process does not affect the insulation property of the high-voltage device, thereby avoiding the safety hazard caused by a wire connection between the high-voltage device and the host. The detection system in the present invention can simplify a field measurement structure, and the measurement on the high-voltage device can be completed by using a single optical fiber. No electrical signal is transmitted, so that the measurement on the high-voltage device is safer, and multiple types of gases of multiple measurement gas chambers can be measured at the same time.

Those skilled in the art should understand that the embodiments of the present application may be provided as a method, a system, or a computer program product. Therefore, the present application may use a form of hardware-only embodiments, software-only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Finally, it should be noted that, the above embodiments are merely intended to describe the technical solutions of the present invention, rather than to limit the present invention. Although the present invention is described in detail with reference to the above embodiments, it should be appreciated by a person of ordinary skill in the art that modifications or equivalent substitutions may still be made to the specific implementations of the present invention, and these modifications or equivalent substitutions made without departing from the spirit and scope of the present invention shall fall within the protection scope of the claims of the present invention.

The invention claimed is:

1. An optical detection system, for detecting a decomposition product on a high-voltage device, comprising:
    a measurement gas chamber applicable to be mounted on the high-voltage device and for communicating with a gas chamber of the high-voltage device; and
    a measurement host,
    wherein a collimator and a reflector are disposed on two sides of the measurement gas chamber respectively, and the measurement host is connected to the collimator; and
    the collimator is configured for emitting measurement laser to the measurement gas chamber according to a laser signal sent by the measurement host, and receiving reflected laser from the reflector and transmitting the reflected laser to the measurement host,
    wherein the measurement host comprises a laser device, a switching module, and an infrared detector;
    the switching module is connected to the laser device and the infrared detector respectively; and
    the switching module is configured for transmitting a laser signal from the laser device to the collimator, and transmitting the reflected laser from the collimator to the infrared detector.

2. The optical detection system according to claim 1, wherein the switching module is a circulator or a beam splitter.

3. The optical detection system according to claim 1, wherein the measurement host further comprises a beam combining unit, and the laser device comprises at least a first laser device and a second laser device;
    the first laser device and the second laser device are both connected to the beam combining unit, and the beam combining unit is connected to the switching module; and
    the first laser device and the second laser device are configured for measuring decomposition products of different components respectively.

4. The optical detection system according to claim 3, wherein the first laser device and the second laser device are used at different moments, to measure decomposition products of different components.

5. The optical detection system according to claim 3, wherein the switching module comprises at least a first switching module and a second switching module, the infrared detector comprises at least a first infrared detector and a second infrared detector, and the measurement gas chamber comprises at least a first measurement gas chamber and a second measurement gas chamber; and
    the measurement host further comprises a beam splitting unit, the beam splitting unit is connected to the beam combining unit, the first switching module and the second switching module are respectively connected to the beam splitting unit, the first switching module is further connected to the first measurement gas chamber and the first infrared detector respectively, and the second switching module is further connected to the second measurement gas chamber and the second infrared detector respectively.

6. The optical detection system according to claim 3, wherein the beam combining unit is a beam combiner or an optical multiplexer.

7. The optical detection system according to claim 1, further comprising a mounting flange for mounting of the measurement gas chamber on the high-voltage device.

8. The optical detection system according to claim 7, wherein the mounting flange has a shape the same as that of an overhaul flange of the high-voltage device.

9. The optical detection system according to claim 1, wherein the reflector is a concave reflector.

10. The optical detection system according to claim 2, further comprising a mounting flange for mounting of the measurement gas chamber on the high-voltage device.

11. The optical detection system according to claim 3, further comprising a mounting flange for mounting of the measurement gas chamber on the high-voltage device.

12. The optical detection system according to claim 4, further comprising a mounting flange for mounting of the measurement gas chamber on the high-voltage device.

13. The optical detection system according to claim 5, further comprising a mounting flange for mounting of the measurement gas chamber on the high-voltage device.

14. The optical detection system according to claim 6, further comprising a mounting flange for mounting of the measurement gas chamber on the high-voltage device.

15. The optical detection system according to claim 2, wherein the reflector is a concave reflector.

16. The optical detection system according to claim 3, wherein the reflector is a concave reflector.

17. The optical detection system according to claim 4, wherein the reflector is a concave reflector.

* * * * *